(12) United States Patent
Jaeger

(10) Patent No.: US 11,806,680 B2
(45) Date of Patent: *Nov. 7, 2023

(54) WATER TREATMENT SYSTEM WITH RETRIEVABLE MOUNTING FRAME ASSEMBLY FOR DIFFUSORS

(71) Applicant: Claudius Jaeger, Boulder, CO (US)

(72) Inventor: Claudius Jaeger, Boulder, CO (US)

(73) Assignee: Artemis Rubber Technology Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,248

(22) Filed: Apr. 29, 2022

(65) Prior Publication Data

US 2022/0258109 A1    Aug. 18, 2022

Related U.S. Application Data

(62) Division of application No. 16/593,870, filed on Oct. 4, 2019, now Pat. No. 11,433,361.

(51) Int. Cl.
*B01F 23/23*    (2022.01)
*B01F 23/231*    (2022.01)
(Continued)

(52) U.S. Cl.
CPC ............ *B01F 23/2311* (2022.01); *C02F 3/20* (2013.01); *B01F 23/231142* (2022.01); *B01F 23/231143* (2022.01); *B01F 2101/305* (2022.01)

(58) Field of Classification Search
CPC .......... B01F 23/2311; B01F 23/231142; B01F 23/231143; B01F 2101/305;
(Continued)

(56) References Cited

U.S. PATENT DOCUMENTS

| 2,418,973 | A | * | 4/1947 | Hardinge | ............... B01D 21/22 |
|---|---|---|---|---|---|
| | | | | | 210/531 |
| 3,208,734 | A | * | 9/1965 | Clough | ............. B01F 23/23421 |
| | | | | | 210/219 |

(Continued)

FOREIGN PATENT DOCUMENTS

| JP | 2006159162 A | 6/2006 |
|---|---|---|
| KR | 100984743 B1 | 10/2010 |

OTHER PUBLICATIONS

"International Search Report and Written Opinion issued in International Patent Application No. PCT/US2020/053967 filed Oct. 2, 2020", dated Feb. 10, 2021, 10 pages.

(Continued)

*Primary Examiner* — Stephen Hobson
(74) *Attorney, Agent, or Firm* — Johnson, Marcou, Isaacs & Nix, LLC

(57) ABSTRACT

A method for aerating water in a treatment basin includes positioning at least one bridge above an upper surface of the water in the basin; providing a retrievable mounting frame assembly; securing a guide rail assembly to the bridge; transporting the mounting frame assembly on a transport device to a selected position on the walkway near the guide rail assembly; securing a transfer crane to the walkway proximate the guide rail assembly; transferring the mounting frame assembly from the transport device for connection to the a one guide rail assembly; connecting the mounting frame assembly to the guide rail assembly to provide a supply of air to the first air distribution conduit; moving the retrievable mounting frame assembly from a first position above the upper surface of the water to a second position below the water; and initiating a flow of air to the first air distribution conduit.

11 Claims, 18 Drawing Sheets

(51) Int. Cl.
*C02F 3/20* (2023.01)
*B01F 101/00* (2022.01)

(58) Field of Classification Search
CPC ............ B01F 23/23116; B01F 23/2312; B01F 23/231265; C02F 3/20; C02F 3/201; C02F 3/205; Y02W 10/10
See application file for complete search history.

(56) References Cited

U.S. PATENT DOCUMENTS

| | | | | |
|---|---|---|---|---|
| 3,622,132 | A | * | 11/1971 | Rawlings, Jr. ............ C02F 3/20 285/276 |
| 3,837,629 | A | * | 9/1974 | Matras ................ B01F 23/2311 261/122.1 |
| 3,864,441 | A | * | 2/1975 | Suzuki .................... C02F 3/203 261/122.1 |
| 4,229,302 | A | | 10/1980 | Molvar |
| 4,451,373 | A | * | 5/1984 | Thayer .............. B01F 23/23105 210/195.3 |
| 8,622,370 | B1 | | 1/2014 | Alenzi |
| 10,272,395 | B1 | * | 4/2019 | Patton ................... B01F 33/502 |
| 2011/0121472 | A1 | * | 5/2011 | Magen ................. A01K 63/042 261/120 |
| 2012/0037574 | A1 | | 2/2012 | Gardiner |
| 2012/0171753 | A1 | * | 7/2012 | Ivry ........................ B01F 33/27 435/257.1 |
| 2013/0154132 | A1 | * | 6/2013 | Cook ................. B01F 23/2312 414/800 |
| 2017/0158995 | A1 | * | 6/2017 | Garvik ................... C12M 27/06 |
| 2017/0253516 | A1 | * | 9/2017 | Heimdal ................. B01F 25/54 |
| 2018/0236412 | A1 | * | 8/2018 | Frankel ................... C02F 3/201 |

OTHER PUBLICATIONS

"Office Action issued in U.S. Appl. No. 16/593,870, filed Oct. 4, 2019", dated Oct. 5, 2021, 15 pages.
"Ex Parte Quayle Action issued in U.S. Appl. No. 16/593,870, filed Oct. 4, 2019", mailed Feb. 3, 2022, 6 pages.
"Notice of Allowance issued in U.S. Appl. No. 16/593,870, filed Oct. 4, 2019", dated Apr. 28, 2022, 9 pages.
"First Examination Report; Indian Patent Application No. 202247024187 filed Apr. 25, 2022", dated Aug. 23, 2022.
"Extended European Search Report and Written Opinion European Application No. 20871918.7".

* cited by examiner

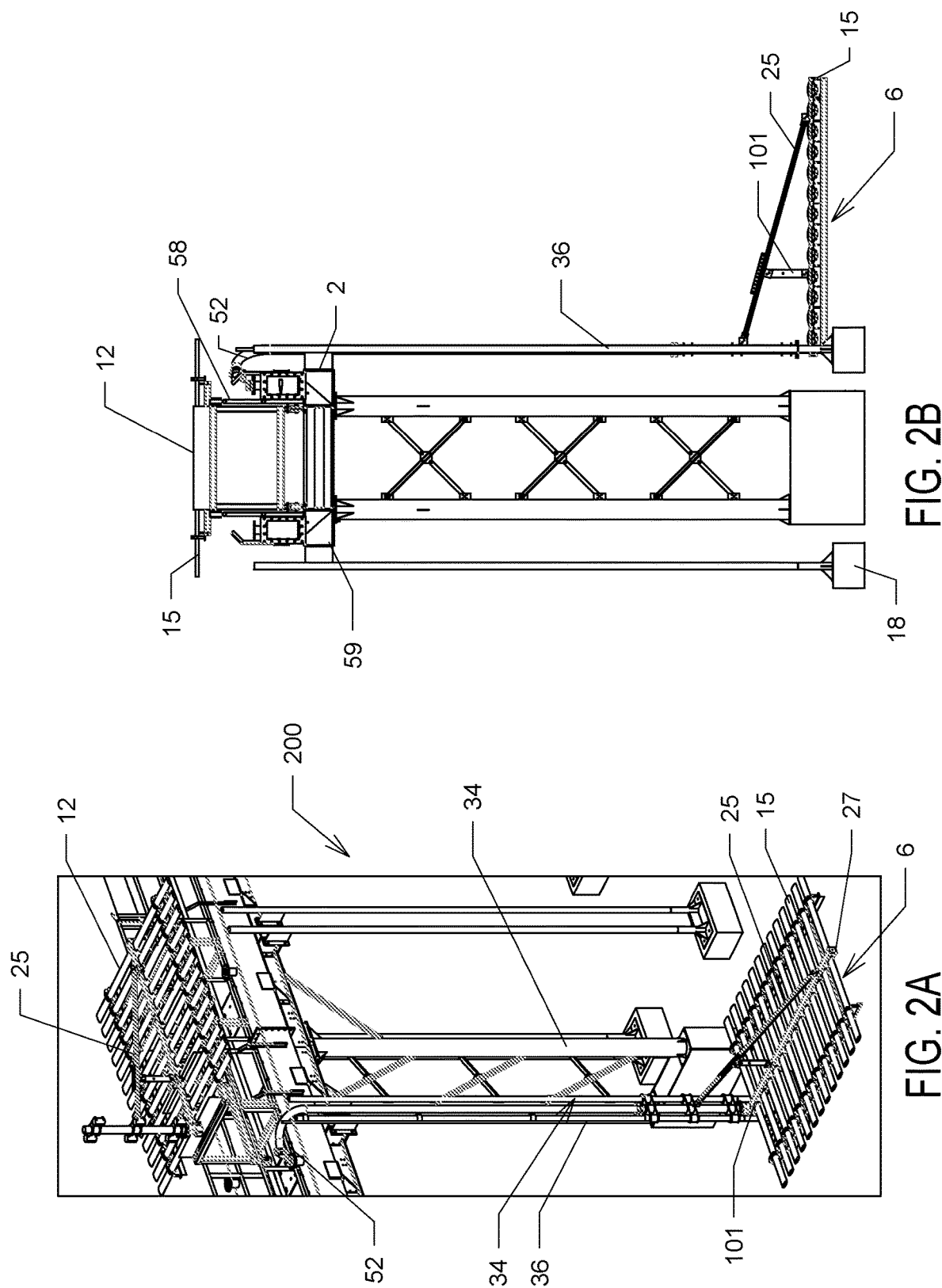

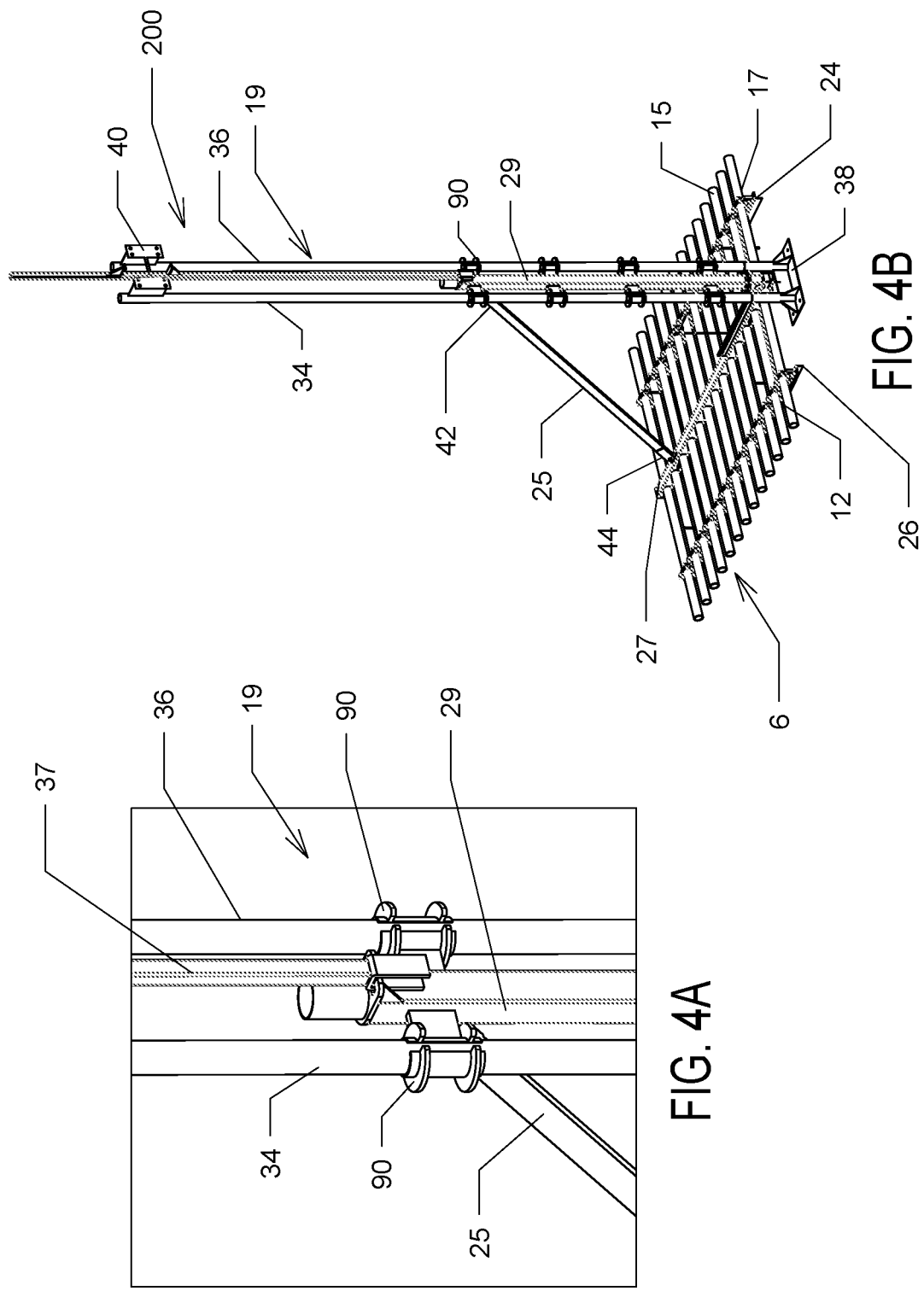

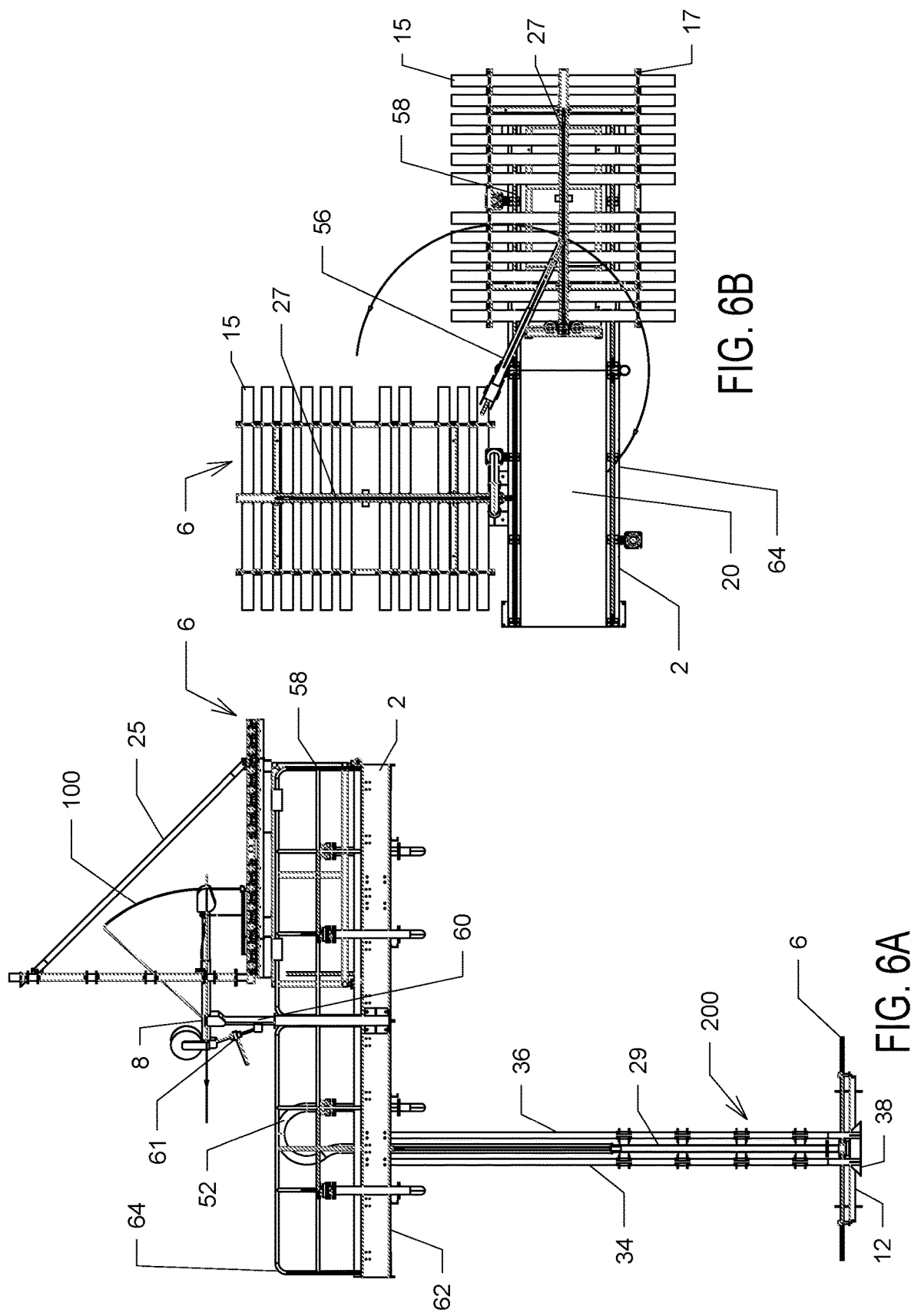

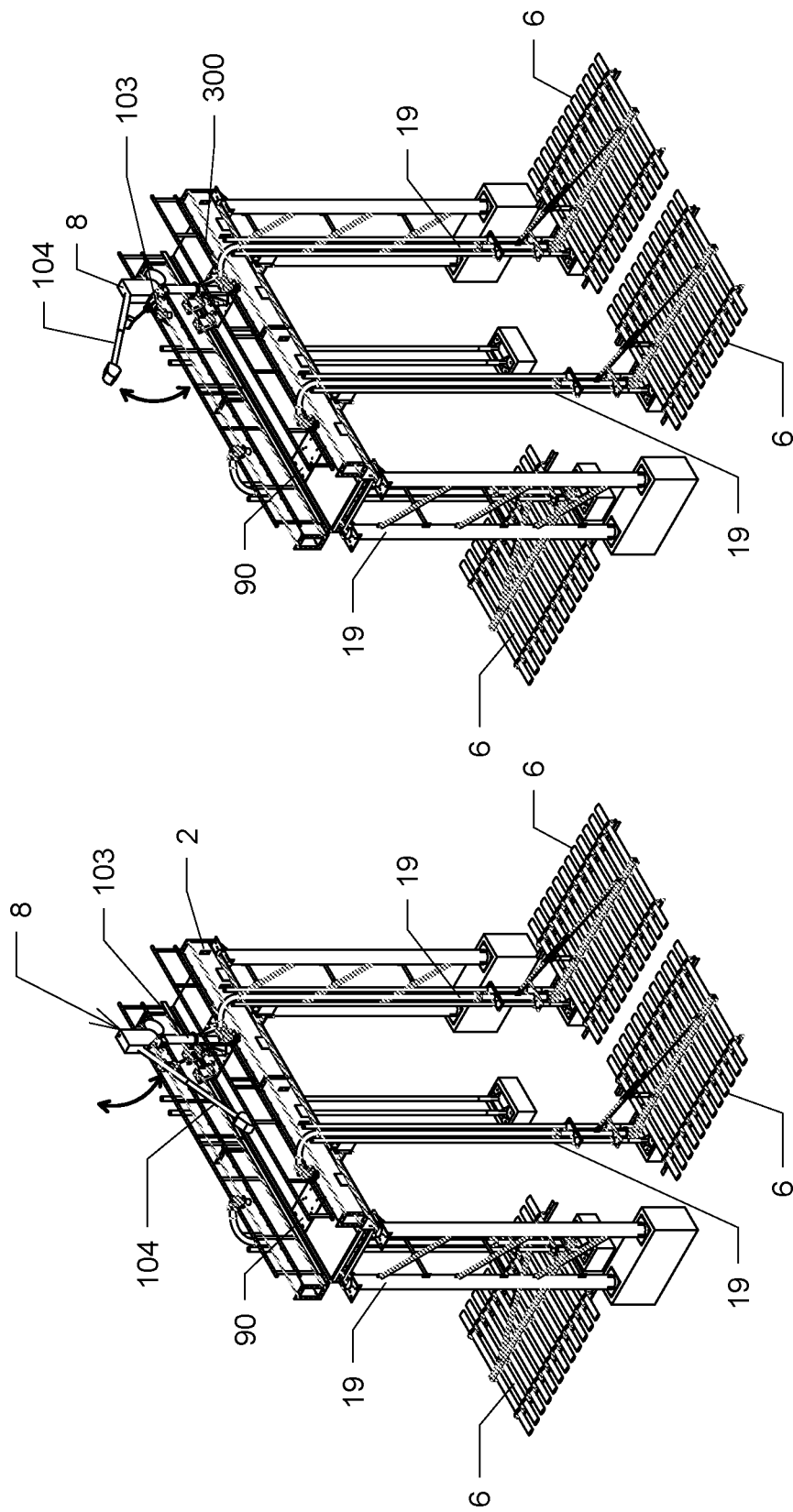

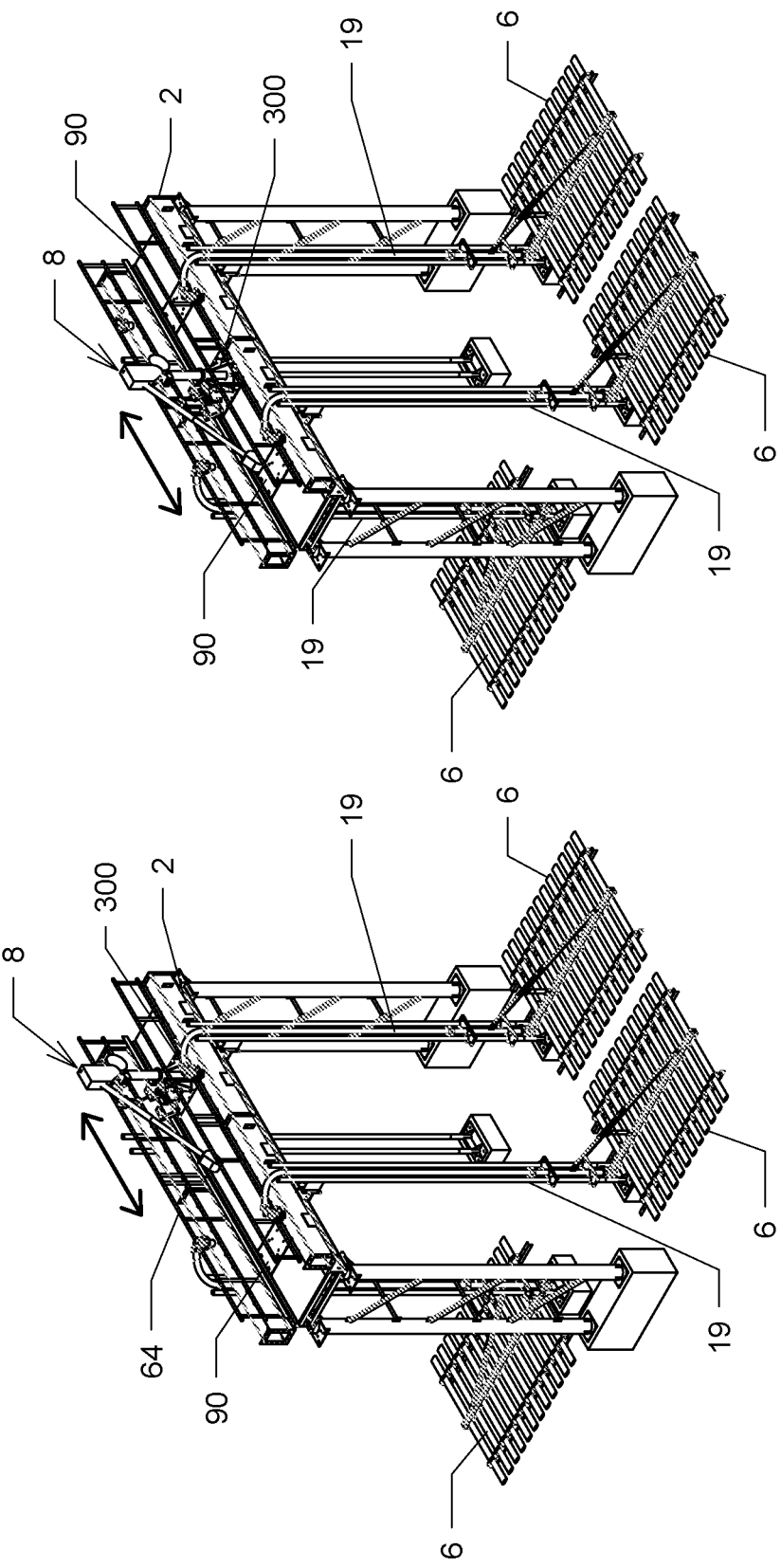

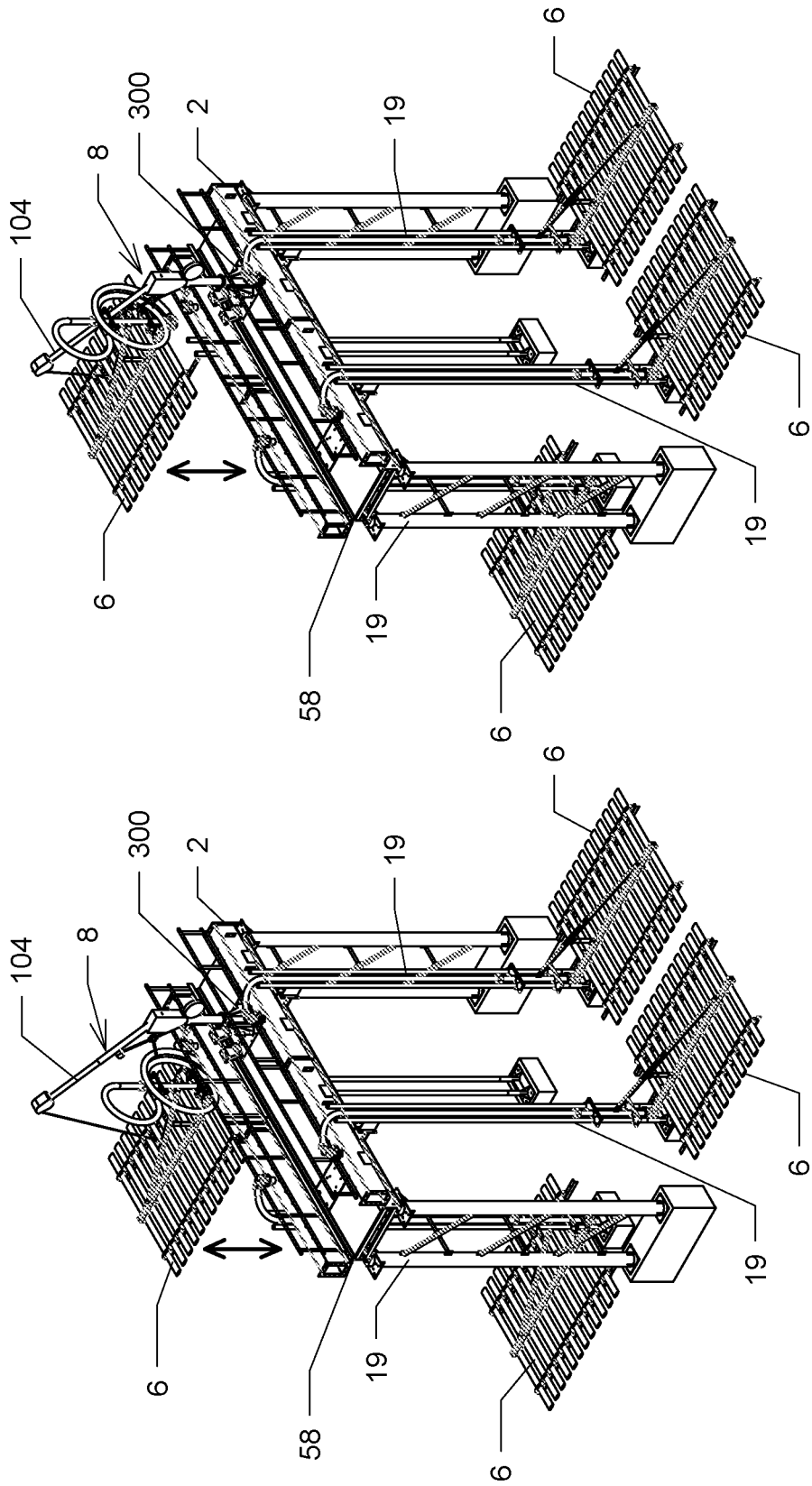

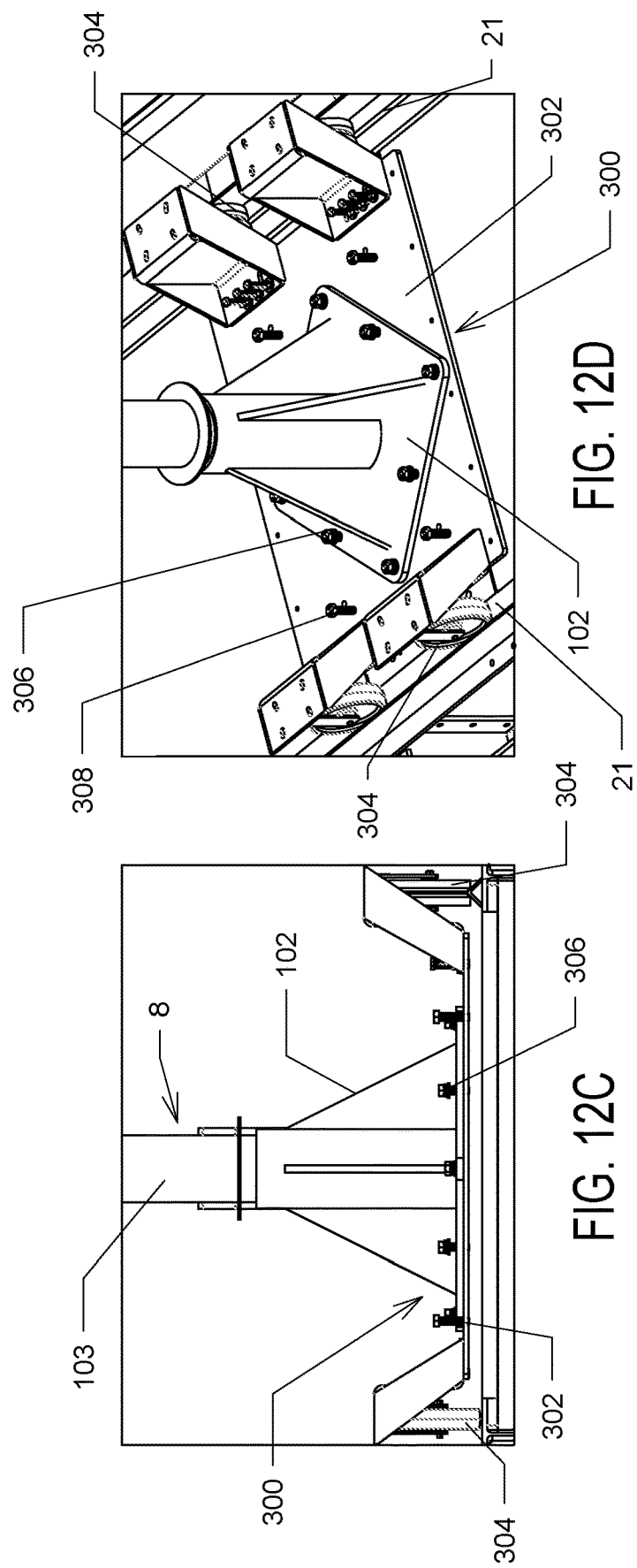

WATER TREATMENT SYSTEM WITH RETRIEVABLE MOUNTING FRAME ASSEMBLY FOR DIFFUSORS

PRIORITY APPLICATION

This application claims the benefit of priority to and is a divisional application of U.S. application Ser. No. 16/593,870 filed Oct. 4, 2019, entitled "Water Treatment System With Retrievable Mounting Frame Assembly For Diffusors," the entire contents of which are hereby expressly incorporated herein by this reference including, without limitation, the specification, claims, and abstract, as well as any figures, tables or drawings thereof.

FIELD OF THE INVENTION

The present invention relates generally to wastewater treatment, and more particularly, to retrievable aeration systems utilized in the gasification of liquids of water in wastewater treatment basins.

BACKGROUND OF THE INVENTION

Activated sludge systems are used to break down organic solids in wastewater by aerobic digestion from microorganisms (biomass). The organisms are then recycled and the remaining products are treated water and waste solids. Carbonaceous Biochemical Oxygen Demand (CBOD) is the amount of carbon-based organic matter in the water that is biodegradable. It is measured as Biochemical Oxygen Demand (BOD). Since this organic matter or nutrients deplete oxygen in the water by digestion of aerobic nutrients by microbes, the goal is to remove the organic solids in the water and lower the BOD level. This is also known as BOD removal. The level of BOD is controlled so that the final decanted water can be released into streams or rivers.

The basic equation for treating BOD with the activated sludge process is BOD+$O_2$+Bacteria→$CO_2$+$H_2O$ (BOD+Oxygen→Carbon Dioxide+Water).

Since the microorganisms use oxygen to break down the suspended solids (SS), oxygen must be introduced into the mixture of water and solids. This mixture is called Mixed Liquor Suspended Solids (MLSS). The amount of oxygen must be great enough for the biomass to break down the solids in the resident time in the waste tank. In order to maximize the amount of oxygen that is dissolved in the water (DO), the oxygen transfer efficiency (OTE) is examined. The more oxygen, the better the biomass can feed and maintain the proper biomass to solids ratio (F:M). The organisms and solids form into an aggregate called floc.

Biological nutrient removal is also a part of the activated sludge process, since nitrogen and phosphorus are elements which can promote the growth of noxious algae in surface waters that received treated waste water. Another demand of oxygen in an activated sludge process is created by oxidizing ammonia to nitrates (nitrification).

A general formula is:

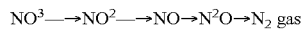

$$NO^3 \rightarrow NO^2 \rightarrow NO \rightarrow N^2O \rightarrow N_2 \text{ gas}$$

Various types of water-treatment apparatus have been developed and are used, for example, in clarification plants/waste water-processing aerobic digestion tanks. In a typical system, a plurality of aeration elements is disposed on a distribution conduit, whereby the distribution conduit on the one hand serves for the supply of air or gas to the aeration elements, and on the other hand also serves for the securement of the aeration elements. A plurality of distribution conduits can in turn be combined to form a system.

In known systems, tube-, disc-, and/or strip-type diffusor elements are generally fixed to the bottom of a water treatment tank or to the bottom surface of a treatment pond via specialized brackets or are self-weighted so that the aeration elements remain at the bottom of the treatment tank or pond to be treated. Aeration elements are typically arranged in various types of grid configurations or in zones on the bottom of the water tank or pond to be treated. Aeration elements in the form of diffusors strips, tubes, or discs, as are commonly used, are consumable in the activated sludge process, and therefore are subject to a great deal of wear and tear, in that the membrane or other material that surrounds the frame or body of the diffusor element can be damaged by movement of the water around the elements. Such aeration elements, therefore, are routinely replaced every 6 to 10 years. The diffusor element frame/body itself can become clogged with debris or even warped over time, or the clamp, bracket, or other element that secures the aeration element to the tank floor can become worn or damaged and require replacement or repair. Maintenance of the diffusor elements, therefore, can be difficult, expensive, and time-consuming, since any damaged components must be accessed and replaced within the water tank or pond, as the diffusor elements are secured to the bottom of the tank via clamps, brackets, or other securement means, as noted above.

As noted above, typically strip-like or tube-like aeration elements also are secured in place to the floor or bottom of a tank or water to be treated, for example, by means of an assembly bracket or other attachment means. These types of arrangements are known as fixed grid diffusor systems. By way of illustration, with one type of assembly bracket, cooperating upper and lower profiled portions are secured around the aeration element at opposite ends of each element. The assembly bracket is in turn secured to the floor by either an anchor bolt in the center bottom hole directly into the tank floor or by two height-adjustable anchors through the two outer holes to enable leveling of the diffuser to bottom of the tank for maintaining the position of an aeration element. It is contemplated that a plurality of brackets can be utilized along the length of the aeration element, rather than only on its ends.

A disadvantage associated with these types of fixed grid systems in wastewater treatment system operations, however, relates to maintenance of the aeration elements once in place and operating in the water basin. To install, repair, replace, or otherwise access the fixed grid-type diffusor system, the water basin must be drained. Thus, in a wastewater treatment plant, the aeration basin must be shut down completely at this point, interrupting processing, unless the system includes a second tank or basin that can still be operated while the first tank is not in use.

A retrievable and modular system, therefore, offers built-in redundancy, that is, 100% uptime, as the basin and the entire aeration system must not be taken out of service during repair and maintenance operations, thus offering much lower costs with regard to operation and maintenance.

While retrievable aeration systems have been developed for use in water treatment systems, most current systems are wall mounted; that is the aeration element frame works in cooperation with a mounting system that is fixed to the wall of a tank, thus limiting the available configurations of the aeration element racks to distances near the tank or basin walls. A basin width that is greater than or equal to 12.5 m, or 40 feet, for example, generally limit whether a retrievable or fixed grid system can be used. Further, elongated aeration basins sharing common walls have limitations regarding the feasibility of retrievable systems for a reasonable investment cost.

The retrievable diffusor frame based on a bridge-mounted system according to the present application therefore overcomes the limitations of a wall-mounted system by spanning across the tank, in the event the geometry of the tank does not provide for a sufficient number of diffusor frames or diffuser coverage on the bottom of the tank or for air distribution in the center of the tank. The system further eliminates the need for parallel or redundant tank systems.

The system of the present application further facilitates replacement and maintenance operations for the diffusors and frames by providing a transfer system including transport device for the diffusor frames or racks and transferrable crane that enables the frames and diffusors to be moved along the bridge into position for deployment or removal at selected positions along the length of the bridge.

Thus, according to the present invention, rather than securing the aeration elements to the tank or pond floor via clamping bracket or other means in a fixed-grid type of system, the aeration elements are secured onto a retrievable mounting frame or rack that can be lowered into or raised out of the tank via a guide rail system that is secured to a bridge spanning the tank. Further, unlike known retrievable diffusors used in water treatment which are commonly mounted to the wall of the tank or basin, the system assembly according to the present application instead allows access to the entire contents of the tank or basis by providing a bridge-mounted system that can be configured depending on the geometry and dimensions of the tank or basin. The system increases operating efficiency by eliminating downtime involved with draining the tank when repair or maintenance to the system is required.

As noted above, the system according to the present invention allows deployment of more retrievable aeration elements per tank, compared to solely wall mounted systems, thereby overcoming tank width and/or diameter limitation of rectangular or round tanks. The system therefore provides for a greater aeration capacity using retrievable diffusers compared to round tanks. The width/diameter limitation of solely wall mounted retrievable system is approximately 60 ft (18.25 m).

SUMMARY OF THE INVENTION

Embodiments of the present invention address the above-noted disadvantages by providing a novel wastewater treatment system with a bridge-mounted, retrievable aeration system.

Aspects of the invention are directed to a water treatment system for use in a water treatment basin with a bridge assembly extending between walls of the tank and a retrievable aeration assembly with a guide rail system fixed to the bridge for deploying and retrieving the diffusor frame assembly. The system further includes a transport system for moving and deploying the diffusor assemblies that includes a transport device for moving the frame assemblies along the length of the bridge and a transferrable crane moveable between lifting positions along the bridge for moving the frame assemblies between the guide rail system and the transfer device. By providing a bridge system that spans the tank and is situated above the surface of the water and a retrievable aeration element frame assembly that can be deployed from selected positions on the bridge system, the aeration elements and frames can be replaced or maintained when necessary, without draining the water from the tank and without requiring a second tank for redundancy.

Aspects of the present invention is a water treatment system that includes at least one bridge assembly that spans a water treatment tank; at least one retrievable diffusor frame assembly for diffuser elements that is moveable between a raised and lowered position into and out of the water tank; at least one guide rail system fixed to the bridge assembly for moving the frame assembly between a first position above the surface of the water to a second position on a bottom surface of the tank; a transfer device for moving the frame assemblies along the length of the bridge; and a transferable crane moveable between lifting positions along the bridge. The bridge walkway can include integrated guide tracks for accommodating wheels or castors of both the transfer device and transferrable crane. In this connection, the crane can include a base that can be fixed to the bridge or walkway when the crane is in use to move the rack assemblies. Further, to facilitate movement of the crane along the bridge, the crane base can be provided with wheels and/or castors that cooperate with the tracks on the bridge that are also used by the wheels or castors of the transport device, so that the crane assembly can be moved along the bridge or walkway, and then fixed into lifting position for moving the frame assemblies.

Additional aspects of the invention are directed to a method for treating wastewater in a treatment basin or tank. At least one bridge is installed that spans the basin and a plurality of retrievable aeration systems, or guide rail system, are installed at selected positions along the length of the bridge. A transport system is provided that includes a transport device or cart for moving the diffusor frames along the bridge walkway in guide tracks provided in the walkway to the guide rail system and a transferrable crane for moving the diffusor frames between the transport cart and the guide rail system.

Further specific features of the invention will be described in detail subsequently.

BRIEF DESCRIPTION OF THE DRAWINGS

This object, and other objects and advantages of the present invention, will appear more clearly from the following specification in conjunction with the accompanying schematic drawings, in which:

FIG. 2A shows a view of the retrievable aeration system with vertical rail guides and frame assembly of FIG. 1C;

FIG. 2B shows an end elevation view of the bridge with vertical rail guides, frame assembly, and cart of FIG. 2A;

FIGS. 4A and 4B show detail views of the vertical guide rails and guide rails with mounting frame assembly, respectively;

FIG. 6A shows a front view of a portion of the bridge with the portable cart and crane assembly positioned thereon;

FIG. 6B shows a top view of the bridge assembly, a transfer cart with mounting frame assembly on the bridge, and a mounting frame assembly in a lowered position;

FIGS. 8A-9B show perspective views of the transferrable crane on the bridge walkway;

FIGS. 10A-10B show perspective views of the transfer crane of FIGS. 9A-10B lifting a mounting frame assembly;

FIGS. 12A-12E show views of the transferrable crane, transfer trolley, and crane mounting base;

DETAILED DESCRIPTION OF THE EMBODIMENTS

Figure 1A:
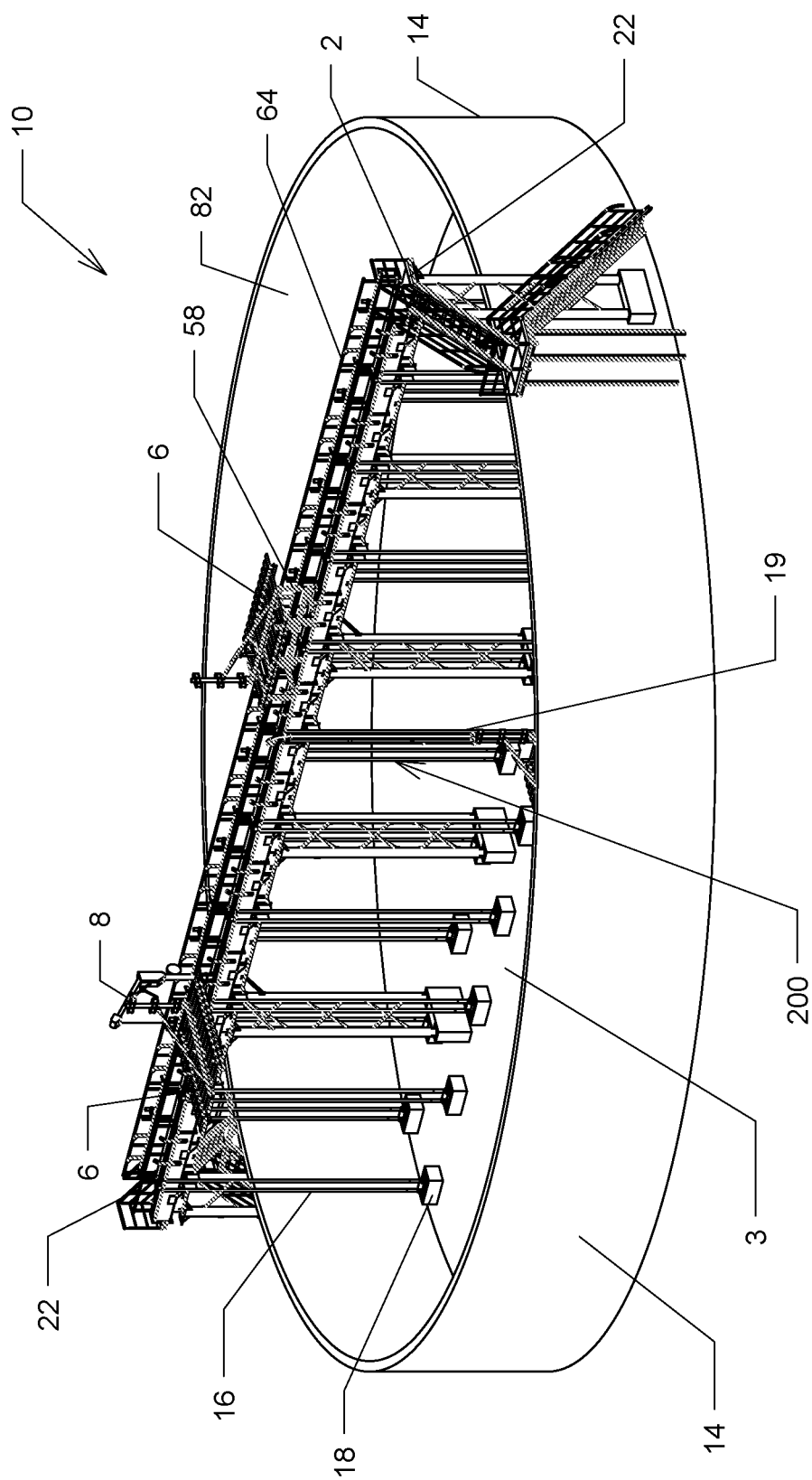
FIG. 1A shows an isometric view of the water treatment system according to the present invention.
Figure 1B:
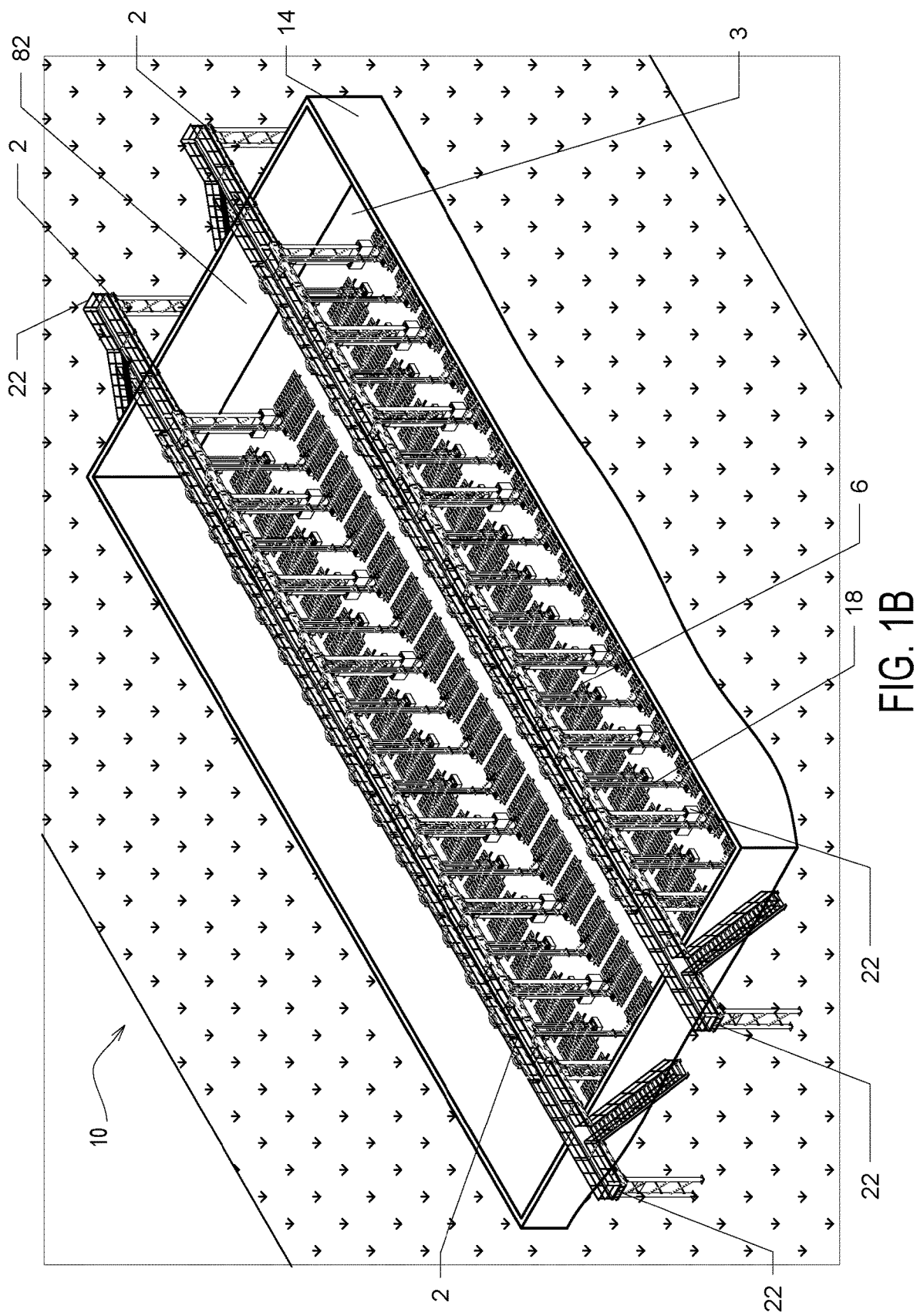
FIG. 1B shows an isometric view of the water treatment system with a rectangular tank configuration with at least two bridge assemblies.
Figure 1C:
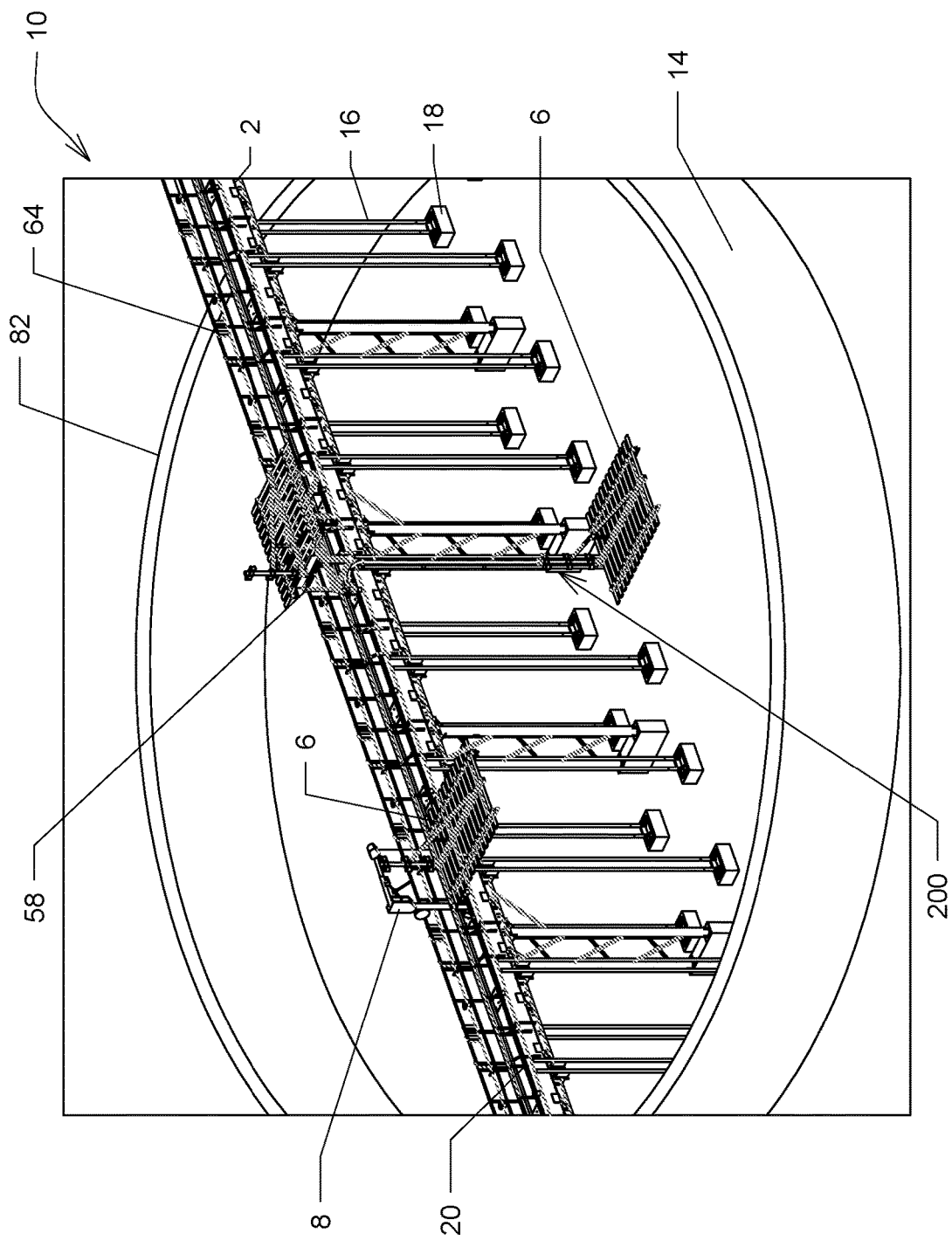
FIG. 1C shows a further isometric view of the system of FIG. 1.

Referring now to the drawings in detail, as shown in FIGS. 1A and 1C, the water treatment system 10 includes at least one bridge 2, a retrievable aeration system 200 including at least one retrievable mounting frame assembly 6 and a vertical guide rail system 19, a transferrable crane or lifting device 8, and a moveable transfer device, or cart 58 for moving the frame assembly along the bridge 2 into position for deployment of the frame assembly and aeration elements into a water treatment tank 14. The water treatment system 10 is shown in FIG. 1A is contemplated for use in a water treatment tank 14, so that the bridge 2 extends across the water treatment tank 14, allowing workers access to the mounting frame assemblies and crane or lifting device 8 through transfers stations 22 on at least one end of the bridge assembly 2, as will be described below. The water treatment system therefore eliminates the need for the retrievable aeration system to be mounted only to the walls of the tank, but instead allows the mounting frame with aeration elements mounted thereon to be placed in a variety of configurations in the water tank, thereby providing more efficient aeration and treatment of the water throughout the entire tank and avoiding draining of the tank for maintenance or repairs.

As noted above, the system according to the present invention allows deployment of more retrievable aeration elements per tank, compared to solely wall mounted systems, thereby overcoming tank width and/or diameter limitation of rectangular or round tanks. The system therefore provides for a greater aeration capacity using retrievable diffusers compared to round tanks. The width/diameter limitation of solely wall mounted retrievable system is approximately 60 ft (18.25 m).

Figure 12B:
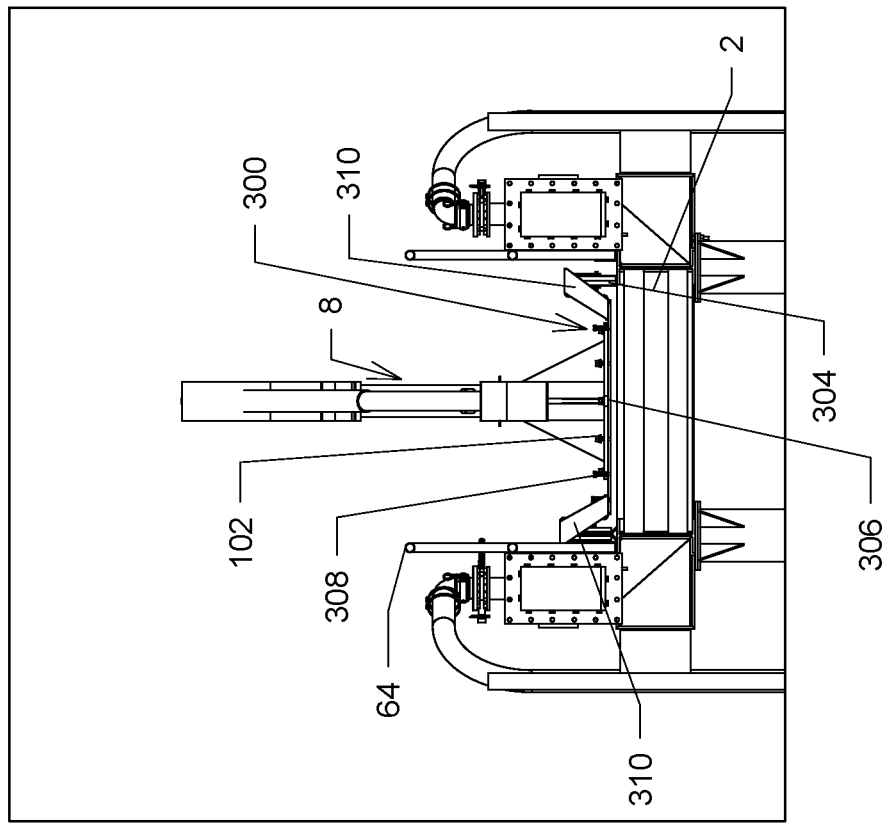
Figure 12A:
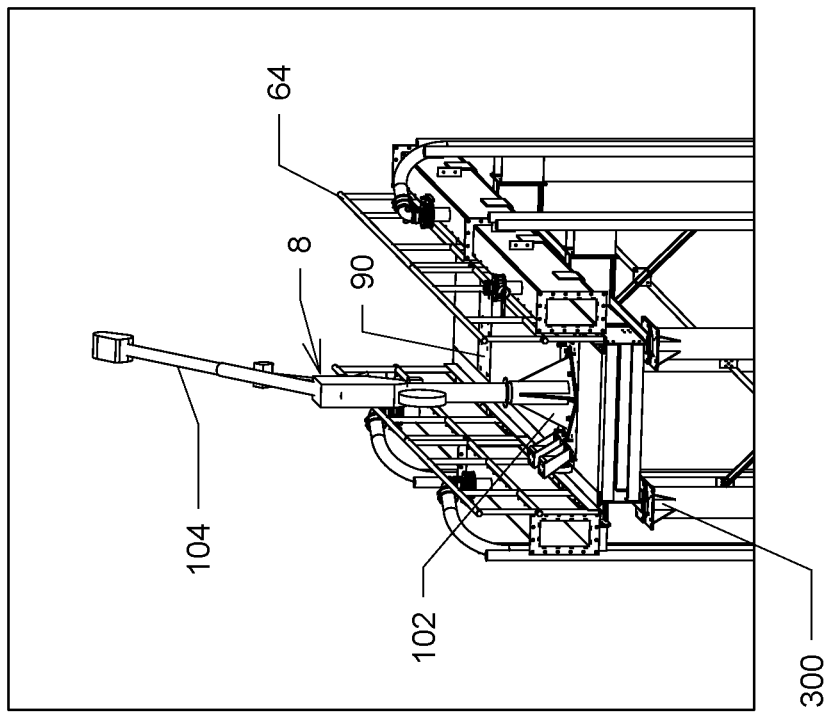
Figure 12E:
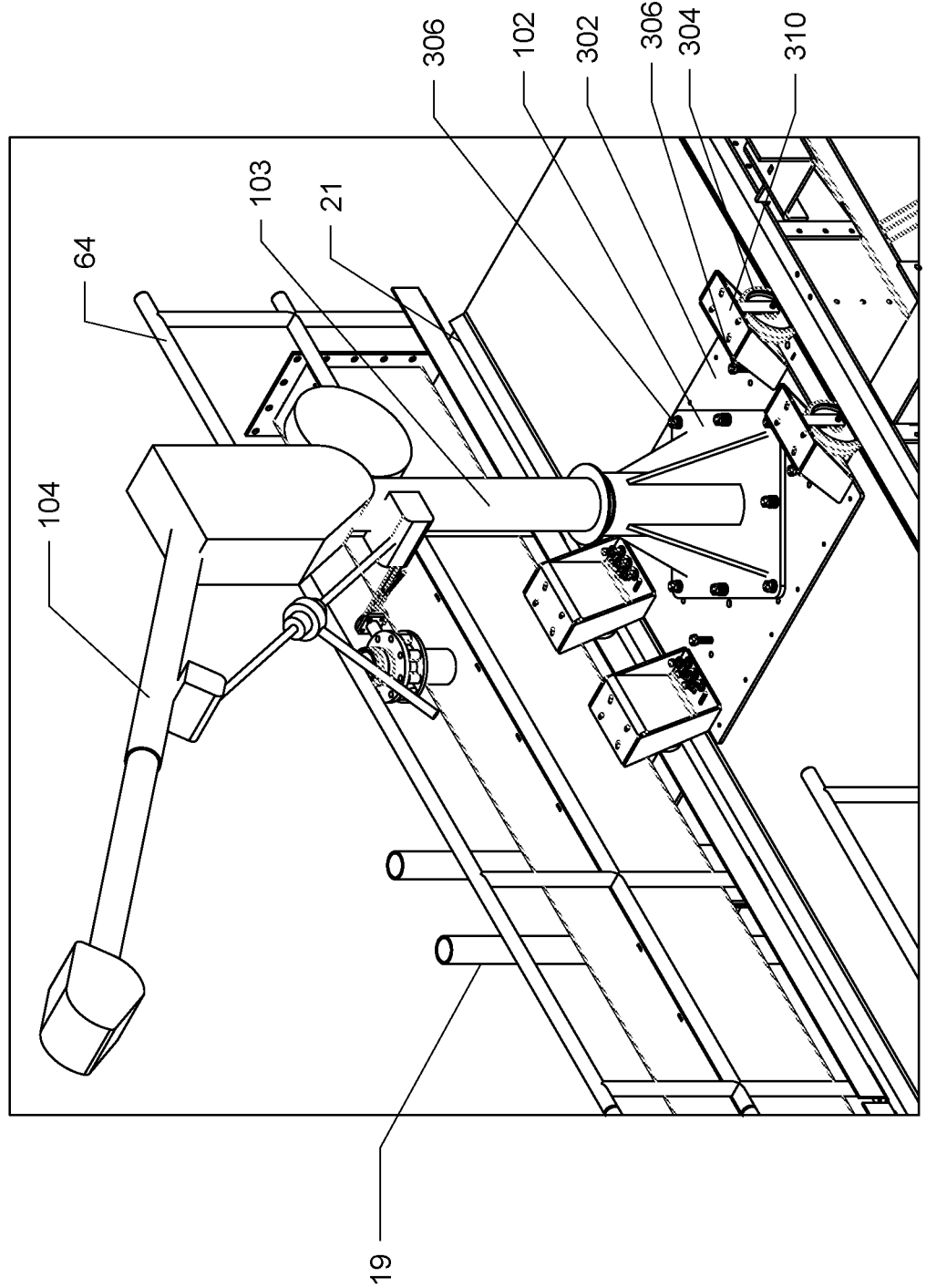

The bridge 2 preferably is constructed of steel and includes a plurality of supports 16, each with a stabilizing base 18 secured to the typically concrete floor 3 of the tank 14. The bridge 2 further includes a walkway, or catwalk, 20 extending across the length of the bridge 2. At least one guide track, preferably two guide tracks 21 positioned parallel to one another, are provided that run the length of the walkway 20 for facilitating movement of the cart 58 and crane 8 along the walkway 20 using wheels or castors on the cart 58 and crane 8, respectively, as will be described below with reference to FIGS. 2a and 12a, for example. That is, the crane 8 and transfer cart 58 preferably can run on the same track system. The bridge assembly further includes transfer stations 22, which are positioned at opposites ends of the walkway and externally to the walls of the tank 14, so that system operators may access the bridge assembly 2 via the transfer stations 22 and load and unload the components of the mounting frame assembly 6, cart 58, and crane 8 for use on the walkway 20. (See also FIG. 15, described below).

As shown in FIG. 1B, one or more bridges 2 may be used, depending on the size and geometry of the water basin. For example, as shown in FIG. 1B, the system allows the use of more than one bridge 2 that span the entire tank 14 and to accommodate a variety of basin configurations, such as the rectangular tank 14 shown in FIG. 1B. While FIG. 1B shows the use of two bridges 2 in a rectangular tank 14, it can be appreciated that the system of the present invention can be utilized in any tank configuration with any number of bridges in any contemplated configuration, depending on the tank geometry.

As shown in FIGS. 1C, 2A-2B, and 4A-4B, the retrievable aeration system 200 includes a vertical guide rail assembly 19, mounting frame assembly 6 with a mounting frame 12, and a plurality of aeration elements 15 mounted to the frame 12 via brackets 17 (see also FIGS. 5A-5D, described below). The vertical guide rail assembly 19 serves for transferring the frame assembly 6 between a position above the water's surface and to a position on the floor 3 of the tank 14. The vertical guide rail assembly 19 includes preferably two vertical guide rails 34, 36 positioned parallel to one another and extending from the bridge 2 to the floor 3 of the tank 14, a lower fixing bracket 38 for securing the vertical guide rail assembly 19 to the floor 3 of the tank 14, and an upper fixing bracket 40 for securing the vertical guide rail assembly 19 to a railing or other component of the bridge system 2. A flexible hose 52 provides a supply of air to an air distribution conduit 29 and is positioned between the vertical guide rails 34, 36 for connection via a suitable valve coupling to a flexible air supply hose 52. A first end 42 of the control arm 25 is secured to air distribution conduit 29 and at an oppositely disposed second end 44 of the control arm 25 is attached proximate an end of the central air distribution conduit 27 in the mounting frame 12.

A hold-down bracket or rod 37 is provided between the vertical guide rails 34, 36, and is coupled to the air distribution line 22 and operates to prevent the diffuser rack from rising up by its own system buoyancy during standard operation. Guide brackets 90, which are fixed to hold-down rod 37, slidingly engage around guide rails 34, 36, respectively, to facilitate movement of the hold-down rod 37. A pneumatic or hydraulic source or jack system positioned on the walkway 20, when actuated, causes the hold-down rod 37 and air distribution conduit 29 to be pushed vertically downward between and along the vertical guide rails 34, 36 via the guide brackets 90, thereby lowering the mounting frame 12 and aeration elements 15 into the tank and water for placement on floor of the tank 14, as shown in FIG. 2A. The vertical guide rails 34, 36, being both secured to the floor of the tank 14 and the bridge 2 or walkway 20, therefore provide a stabilizing support for the hold-down bracket or rod 37 and air distribution conduit 29, without the necessity of securing the guide rails or other support structure to the walls of the tank.

It is also contemplated, however, that the vertical guide rail system 19 could be mounted and secured to the walls of a water treatment tank for use with the mounting frame assembly 6, without requiring the bridge assembly 2 and walkway 20.

As shown in FIGS. 5A-5D, the mounting frame 12 includes at least two mounting rails 24, 26 arranged parallel and spaced from one another. A plurality of aeration elements 15 are positioned on the mounting frame 12, such that each of the two mounting rails 24, 26 is positioned proximate to opposite ends of the aeration elements 15. While the figures show elongated aeration elements having an oval cross section, it is also contemplated that tubular or disc-shaped, or other aeration elements could be used with the frame assembly 6 and water treatment system 10 according to the present invention with the same effect.

Figure 5C:
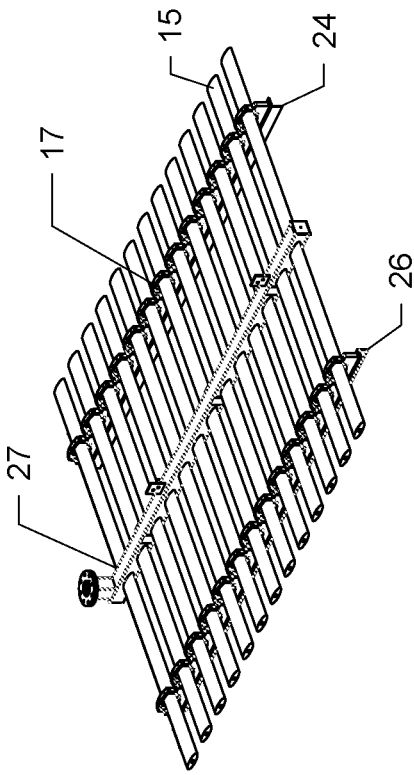
FIGS. 5A-5D show detail views of the retrievable mounting frame assembly with mounting brackets and aeration elements.
Figure 5D:
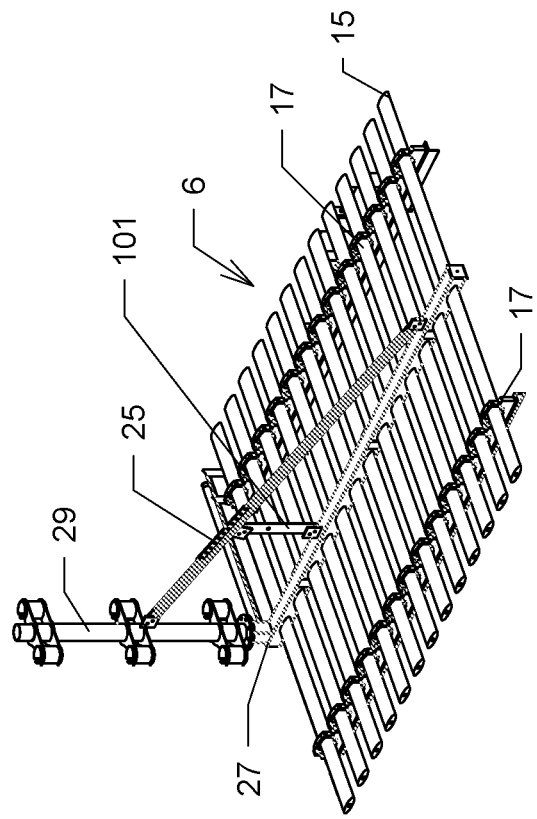
Figure 5A:
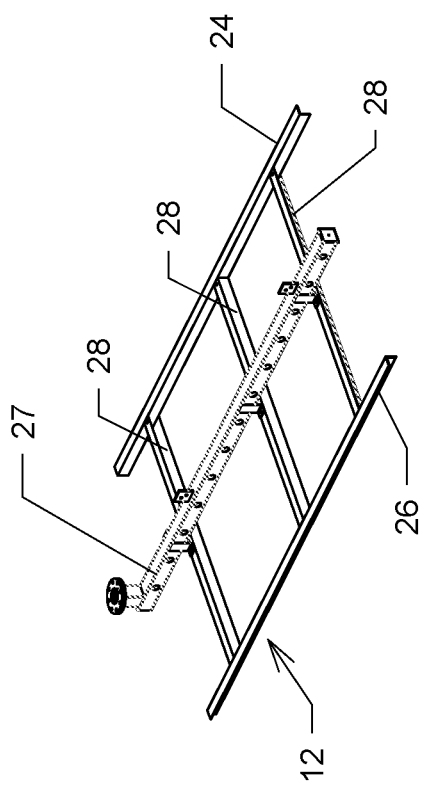
Figure 5B:
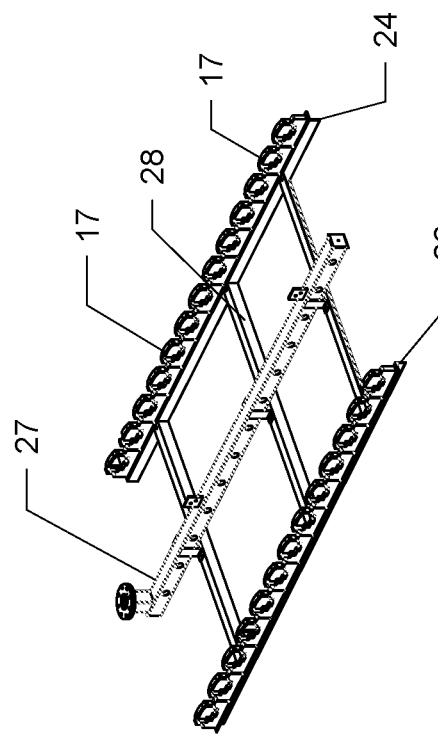

At least two further mounting rails 28 are positioned perpendicular to mounting rails 24, 26 to form the substantially rectangular mounting frame 12. A central air distribution conduit 27 is positioned centrally in the mounting frame 12 to supply the aeration elements 15 with an airflow, in the manner to be described below. The aeration elements 15 are each coupled to the central air distribution conduit 27 via a suitable coupling to enable air flow into the aeration elements 15 and secured to the mounting rails 24, 26 with brackets 17. As shown in FIG. 5B, mounting brackets 17 are secured, for example screwed, onto mounting rails 24, 26. When the aeration elements are position onto the mounting frame, as shown in FIG. 5C, brackets 17 engage around the aeration elements 15 proximate to opposite ends of the aeration elements 15, so that the aeration elements 15 are thereby secured to the mounting rails 24, 26 and a length of each aeration element 15 extends beyond the respective mounting rail 24, 26. By way of example, the bracket device of U.S. Pat. No. 981,480 to the same inventor as the present application is referenced, the subject matter of which is incorporated herein by reference. The central air distribution conduit 27 in turn is connected to a further air distribution conduit 29 arranged perpendicular to the central air distribution conduit 27 and extending vertically upward to the bridge assembly 2, in particular, the walkway 20, for connection to an air supply provided via a flexible air hose 52 provided on the walkway 20. The air distribution conduit 29 extends upwardly from the mounting frame 12 and between vertical guide rails 34, 36 of the vertical guide rail system 19 described in greater detail below.

By way of example, the aeration elements 15 are shown as elongated aeration strip elements having a substantially oval cross-section, with an elastomeric and flexible tubular membrane having air slits provided only on a top surface of the aeration element when the membrane is placed around the aeration element, and an air inlet with a threaded connection to connection the aeration element to a distribution conduit that serves for the supply of gas or air. In this type of aeration element, the support member of the aeration element is made up of a rigid, hard plastic material having a corrugated, hollow profiled and with corrugated outer surfaces, such that a plurality of grooves is formed between the ridges of the corrugated surfaces, both on the inner and outer surfaces of the support member. However, as noted above, the mounting frame assembly can be used with tubular or disc-shaped diffusors/aeration elements, which are known in the relevant art, with the same effect as strip diffusors with an oval cross section.

As noted above, the mounting frame assembly is designed to provide buoyancy when the aeration elements are in place on the mounting frame 12. The frame components themselves are preferably made of a lightweight metal, such as stainless steel, although other suitable lightweight materials could be used to the same effect. The construction of the aeration elements 15, in particular, by their elongated design, whether tubular or flattened with an oval cross section, also provide buoyancy to the mounting frame assembly. (Reference is made to U.S. Pat. No. 970,752 by the same inventor as the present invention, the subject matter of which is incorporated by reference, with regard to an example of the elongated, oval-cross sectional aeration elements that could be utilized with the mounting frame assembly). While the hold-down bracket or rod 37 assists in lowering the mounting frame 12 with the aeration elements 15 in place into the tank, positioning the mounting frame 12 onto the floor of the tank, and maintaining the mounting frame 12 and aeration elements 15 in that position on the floor of the tank, the buoyancy of the mounting frame 12 with the aeration elements 15 may require adjustment of the air flow being fed into the aeration elements to facilitate in lowering the mounting frame 12 into the water. Airflow preferably is shut off for this particular aeration element and diffuser frame element, so that the aeration elements deflate to minimize buoyancy. For example, the air supply can be stopped via a shut off valve and air is then bled out of the air supply system via the aeration elements, allowing the mounting frame 12 to be more easily lowered into the water.

Figure 7:
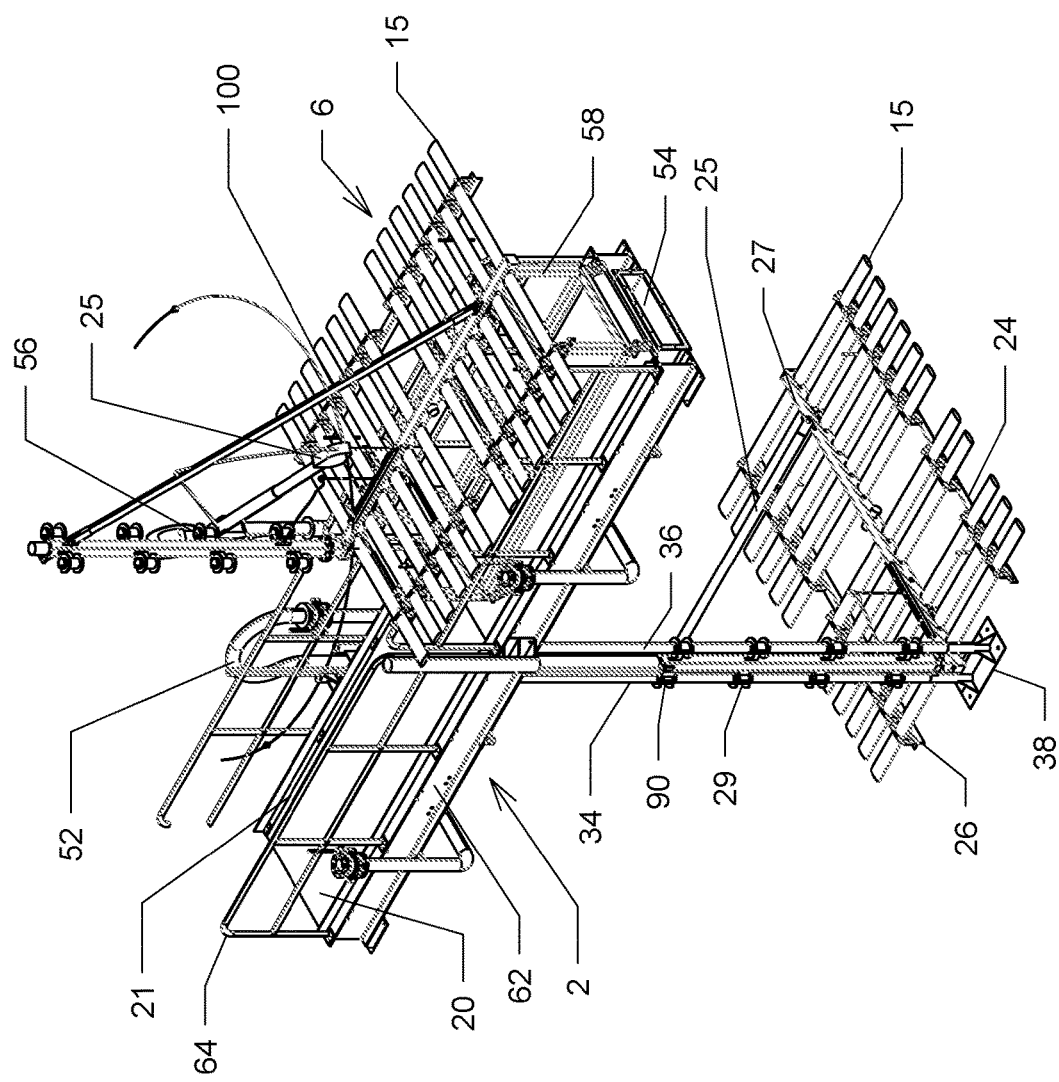
FIG. 7 shows a further view of the bridge assembly with a diffuser rack transfer cart supporting a mounting frame assembly.
Figures 11A, 11B:
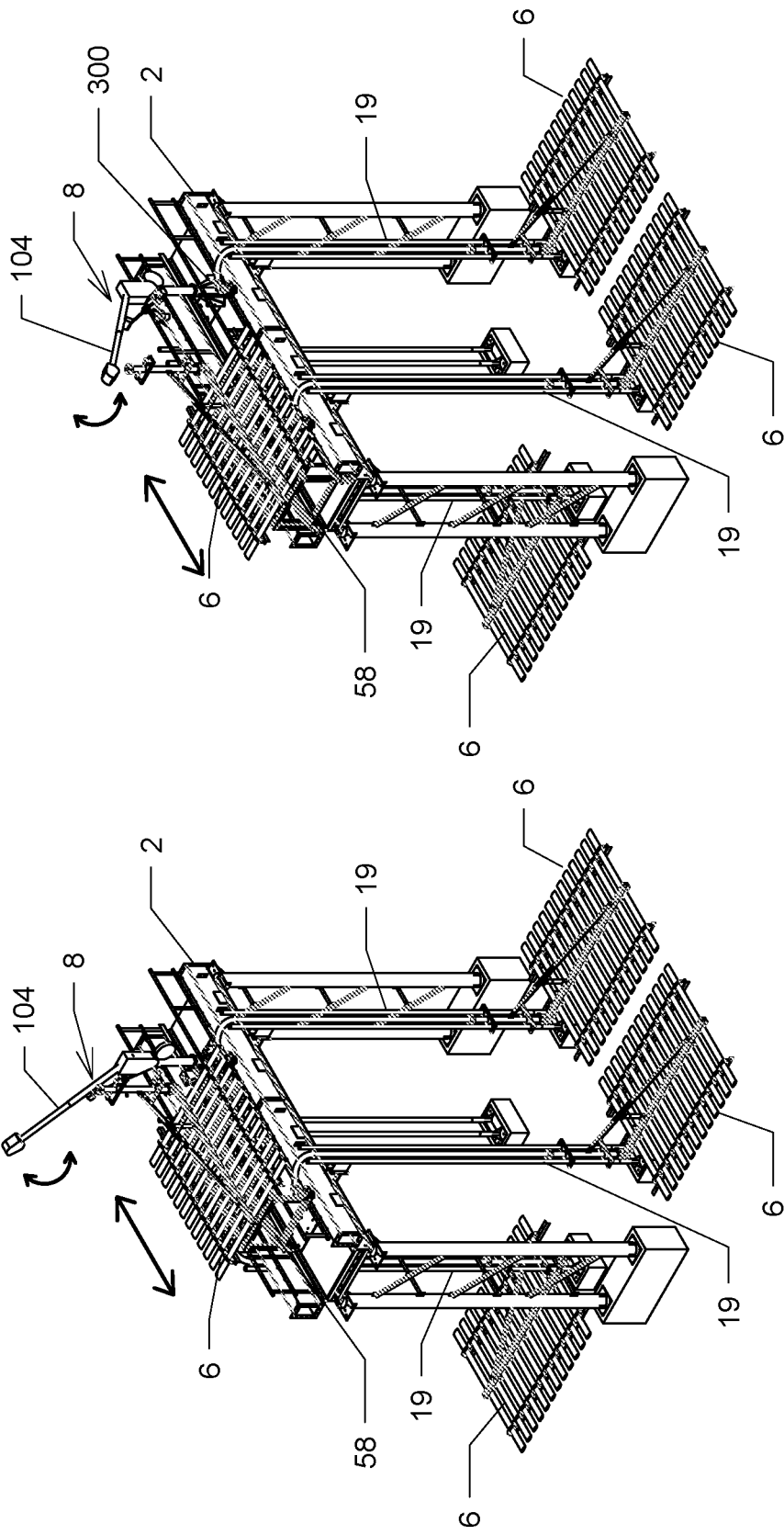
FIGS. 11A-11B show the mounting frame assembly in position on the transfer cart after placement on the cart by the crane.

Referring to FIGS. 6A-6B and 7, the mounting frame 12 with the aeration elements 15 in place can be removed manually out of the tank by securing a lift cable 100 to mounting frame 12, via a connection flange, for example. The mounting frame 12 and aeration elements 15, therefore, can be pulled manually out of the water tank 14, for example with the crane 8 and lift cable 100, for maintenance or replacement of components.

The vertical guide rail system 19 is secured at an upper end via one or more upper end fixing brackets 40 to the bridge 2 that extends from a wall or walls 82 of the tank over the surface of the tank, extending either completely or partially between the walls of the tank. While the figures show a circular tank, the water treatment system 10 also can be used for any other tank geometry, such as square or rectangular tanks. The air distribution line 22 is secured to a flexible hose 52, which in turn connects to one or more air supply conduits 54 running on the outside of a bridge railing or is mounted beneath the walkway 20 of the bridge 2, for supplying air to the aeration elements 15 in the mounting frame 12.

As noted above, the water treatment system 10 includes the bridge 2, the mounting frame assembly 6, the vertical guide rail assembly 19, a lifting crane 8, and a transport device 58. The transport device, or cart, 58 can be a wheeled cart, shown by way of example as cart 58, for moving the mounting frame 12 and aeration elements 15 along the bridge 2 and walkway 20, into position for deployment into the water tank or moving the mounting frame 12 and aeration elements 15 off the bridge 2 for repair or maintenance.

Figure 3B:
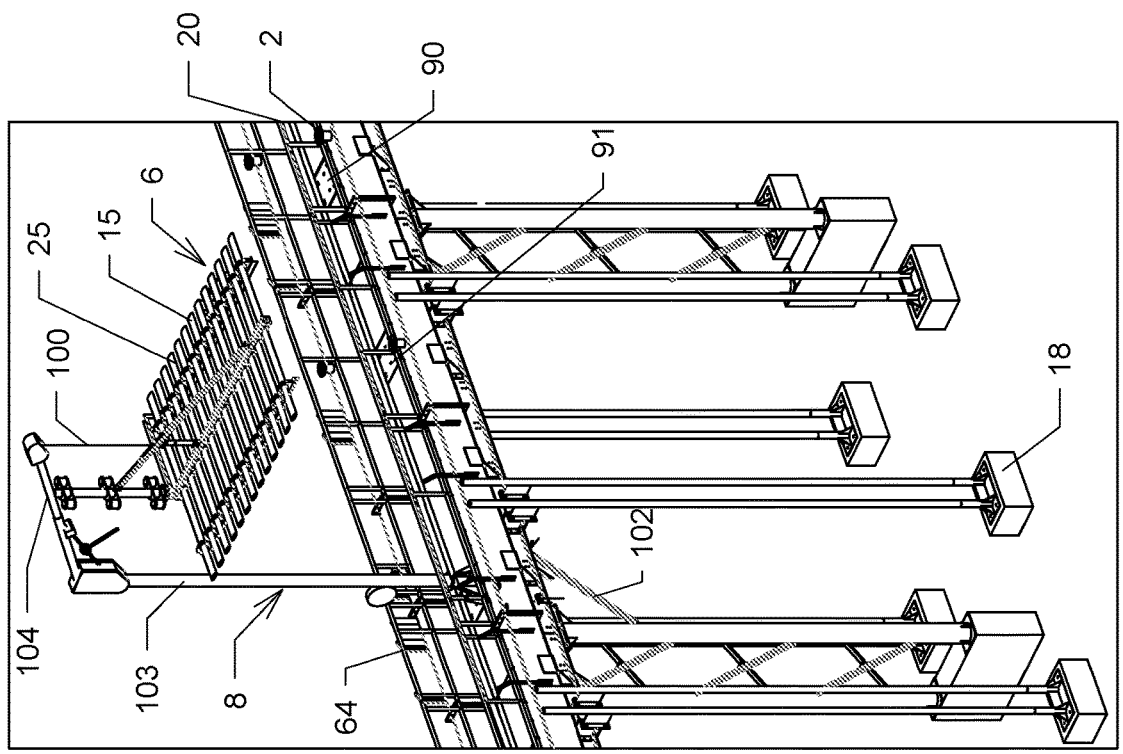
FIG. 3B shows a perspective view of the lifting and transfer crane with a retrievable mounting frame assembly.
Figure 3A:
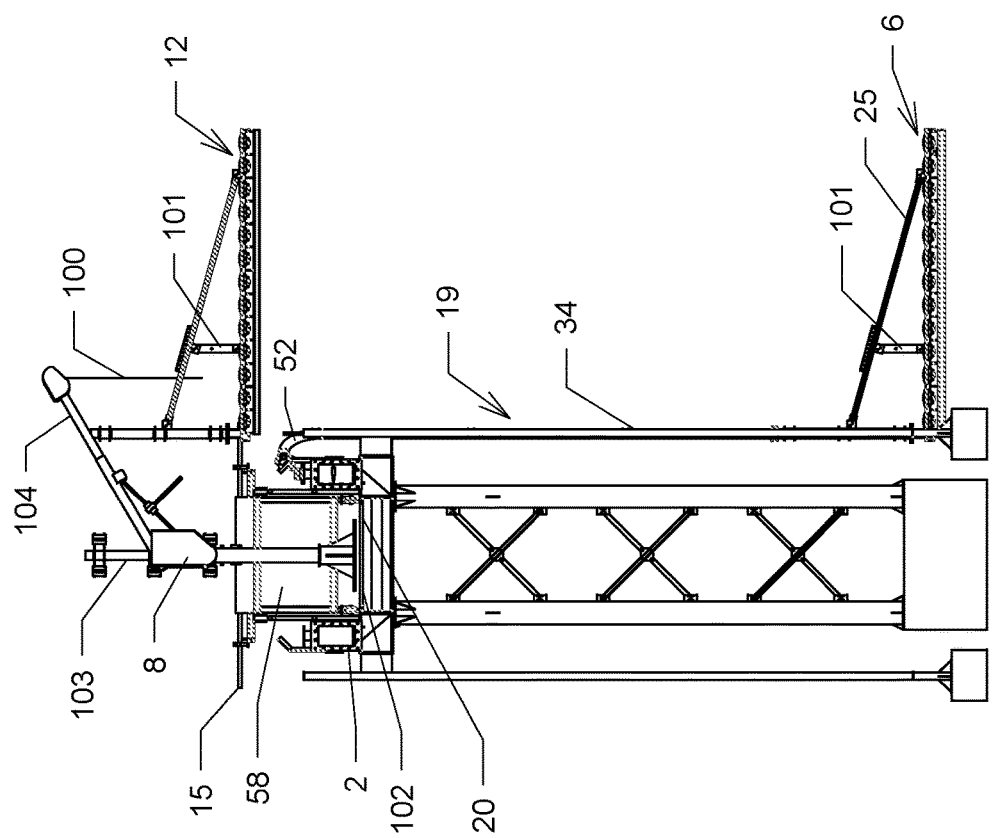
FIG. 3A shows an end elevation view of the bridge assembly, transport cart, retrievable mounting frame assemblies, and a lifting and transfer crane fixed to the bridge assembly for moving and positioning the retrievable mounting frame assemblies.

As best shown in FIGS. 3A-3B, the lifting and pivoting crane 8 includes a mounting base 102, a post 103, and a lifting and pivoting arm 104. The mounting base 102 is secured to the walkway 20 of the bridge 2. In this connection, the walkway 2 is provided with a plurality of mounting plates 90 that are secured to the surface of the walkway 2, each mounting plate 90 having a plurality of through-holes 91 for securing the mounting plate 102. The crane 8 preferably is positioned between two vertical guide rail assemblies 19, so that one crane 8 can service both assemblies 19 by pivoting the crane's lifting and pivoting arm 104. The pivoting and lifting arm 104 extend beyond an upper rail 64 of the bridge 2 at a height sufficient to allow the crane 8 to engage, lift, and pivot the mounting frame 12 onto the bridge, specifically, onto the transport device 58, shown here as moveable cart or frame, positioned on the walkway 20. The crane 8 includes a pulley line 100 for attachment to a flange or other element on the central air conduit 27 in the mounting frame 12.

After the mounting frame 12 has been removed from the water tank via the vertical guide system, 19, the crane 8, in a known manner, then is operated to manually move the mounting frame 12 from a position disposed above the water and perpendicular to the bridge 2 and walkway 20 into position onto the transfer cart 58, as shown in FIGS. 6A and 6B. The mounting frame 12 then can be released from the pulley line 100 of the crane 8 and transported via the moveable cart 58 off the bridge 2 and walkway 20 and onto the transfer station 22 to be removed from the bridge 2 (FIG. 15). Likewise, the mounting frame 12 and aeration elements 15 can be loaded onto the transfer cart 58 at the transfer station 22 and moved onto the bridge 2 and walkway 20 from the transfer station 22, so that the mounting frame 12 and aeration elements 15 can be deployed into the tank, either initially or after servicing.

FIGS. 4A through 4B show further perspective and end views, respectively, of the water treatment system 10, including the bridge 2, the vertical guide rail system 19, the retrievable mounting frame assembly 6, and the cart 58. As shown in FIGS. 4A and 4B, the mounting frame assembly 6 may further include a stabilizing arm 101 secured at one end to the control arm 25 and at an opposite end to the frame 12 to facilitate in raising and lowering the frame 12 and aeration elements 15 into and out of the water in a level manner.

Figure 13:
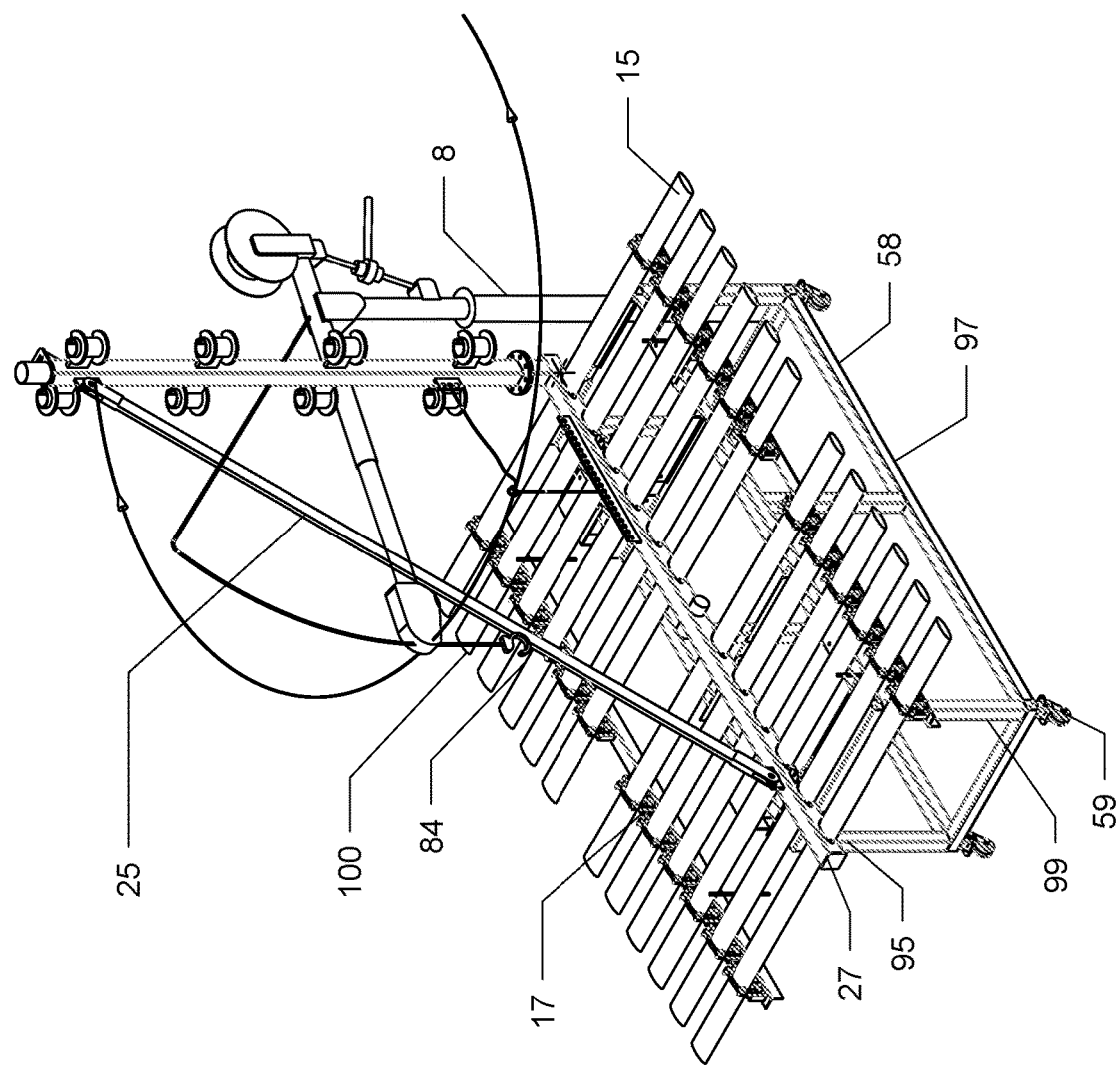
FIG. 13 shows a view of the mounting frame assembly in place on the transfer cart.

FIG. 7 shows a view of the mounting frame 12 and crane 8, with the mounting frame 12 in place on a moveable transport device 58, such as a wheeled cart or frame. As can be seen also from FIG. 13, the transfer cart 58 is generally formed as a lightweight but sturdy rectangular steel or metal frame with upper rails 95, lower rails 97, and vertical rails 99 extending between and connecting the upper rails 95 and lower rails 97. The transfer cart 58 includes wheels or castors 59 positioned on the lower rails 97 to facilitate movement of the cart 58 in guide tracks 21 formed in the walkway 20 of the bridge 2. The cart 58 is dimensioned to conform to the width of the bridge 2 and walkway 20 and has a height that enables the mounting frame 12 to be positioned on the cart 58 such that the mounting frame 12 with the aeration elements 15 have adequate clearance over the upper rail 64 of the bridge 2 and walkway 20 during transport of the transfer cart 58 along the walkway 20.

While the crane 8 was described above as mounted and fixed to the bridge 2, as shown in FIGS. 9A through 13D, a further embodiment of the crane 8 contemplates that the crane 8 is more readily transferable between mounting plates 90 fixed to the walkway 20. The crane 8 is similar in features to the crane 8 described above, except in this embodiment, the mounting base 102 can be fixed instead to a transfer trolley 300. The transfer trolley 300 has a substantially rectangular base plate 302 and wheels and/or castors 304 positioned on and mounted via mounting brackets 310 to opposite sides of the base plate 302. The mounting base 102 is secured to the base plate 302 of the transfer trolley 300 via a plurality of bolts, for example. Further bolts 308 secure the base plate 302 of the transfer trolley 300 to the walkway 20 by engaging through the through-holes 91 provided in the mounting plates 90. In operation, and as illustrated in FIGS. 8A and 8B, the crane 8 is secured to the transfer trolley 300, and the transfer trolley 300 secured to a mounting plate 90 on the walkway 20 proximate to at least one vertical guide rail assembly 19. FIGS. 9A and 9B illustrate transfer of the crane 8 via the transfer trolley 300 between mounting plates 90 on the walkway 2. Once the transfer trolley 300 and therefore the crane 8 are secured to the mounting plates 90 on the walkway 2, the crane 8 is then ready to be operated to live and or lower the frame 12 and aeration elements 14 for deployment on the vertical guide rail system (FIGS. 10A and 10B) or for transfer of the frame 12 and aeration elements 15 onto and off the transfer cart 58 (FIGS. 11A-11B). As shown in FIGS. 12D and 12E, for example, the wheels engage and move in the guide tracks 21 on the walkway 20 which are also used by the transfer cart 58. When it is necessary to transfer the crane 8 to a different location on the bridge 2, the bolts 306 can be loosened/removed and the transfer trolley 300 manually relocated along the guide tracks 21 for securing to a further mounting plate 90 on the walkway 20.

Figure 14:
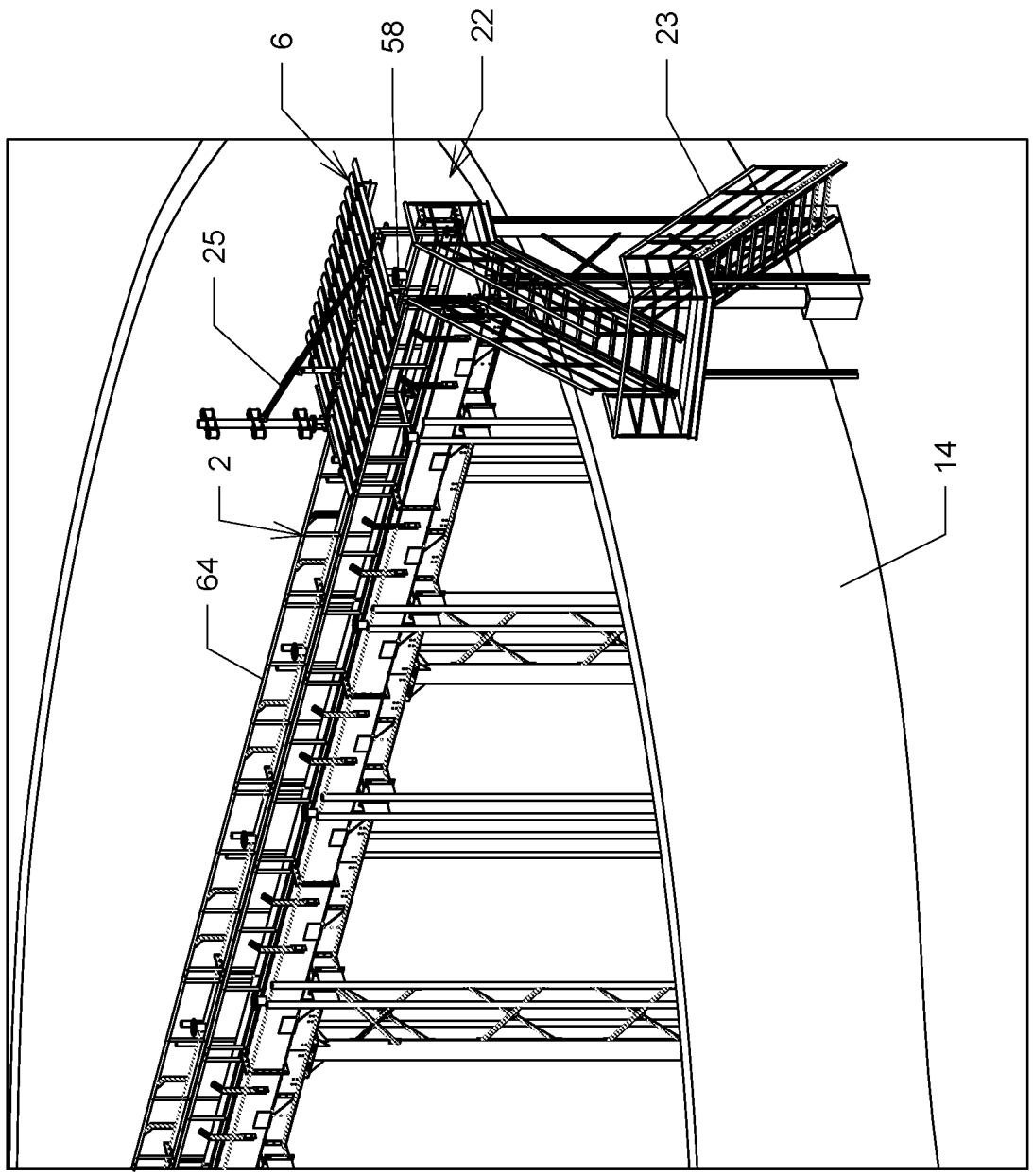
FIG. 14 shows the transfer station at an end of the bridge assembly for lifting and transferring the diffuser frame assemblies from or onto the bridge.

As noted above, the water treatment system 10 includes at least one transfer station 22, as shown in FIG. 14. The transfer station 22 is positioned at one or both ends of the bridge 2 and walkway 20 and includes a platform 400 for receiving the transfer cart 58 with the frame assembly positioned thereon. The transfer station 22 is positioned to extend above and over the wall of the tank 14 so that the platform 400 is disposed outside of the tank 14. When a frame 12 with aeration elements is to be deployed in the tank 14, the transfer cart 58 is moved to the transfer station by an operator and the frame 12 with aeration elements 15 can be loaded onto the cart 58 via a mobile crane or forklift at the transfer station 22 and then transported from the transfer station 22 along the walkway 20 of the bridge 2 into position for deployment. Likewise, when a frame 12 with aeration elements 15 must be removed from the tank 14, the transfer cart 58 with the frame 12 with aeration elements 15 is moved along the length of the bridge 2 to the transfer station 22 where it can be picked up with the forklift or mobile crane and be serviced on the grounds outside the tank, or brought to a maintenance area or workshop of the waste water treatment plant.

The present invention is, of course, in no way restricted to the specific disclosure of the specification and drawings, but also encompasses any modifications within the scope of the appended claims.

What is claimed is:

1. A method for aerating water in a treatment basin, comprising:
   positioning at least one bridge above an upper surface of the water in the basin, the at least one bridge comprising a walkway extending from a first sidewall portion of the basin to a second sidewall portion of the basin;
   providing at least one retrievable mounting frame assembly, comprising a frame; a plurality of aeration elements; a plurality of mounting brackets to secure the aeration elements to the frame; and a first air distribution conduit coupled to the aeration elements for supplying an air flow to the aeration elements;
   securing at least one guide rail assembly to the at least one bridge, wherein the at least one guide rail assembly extends from the at least one bridge to a floor of the basin;
   transporting the at least one retrievable mounting frame assembly on a transport device to a selected position on the walkway proximate the at least one guide rail assembly;

securing at least one transfer crane to the walkway proximate the at least one guide rail assembly;

transferring the at least one retrievable mounting frame assembly from the transport device for connection to the at least one guide rail assembly using the at least one transfer crane;

connecting the at least one retrievable mounting frame assembly to the at least one guide rail assembly to provide a supply of air to the first air distribution conduit;

moving the at least one retrievable mounting frame assembly from a first position above the upper surface of the water to a second position below the water; and initiating a flow of air to the first air distribution conduit.

2. The method of claim 1, wherein the walkway includes parallel guide tracks extending along a length of the walkway.

3. The method of claim 2, wherein the at least one transport device includes wheels and/or castors configured to engage in the guide tracks.

4. The method of claim 1, wherein the at least one transport device has a width that corresponds to a width of the at least one bridge.

5. The method of claim 1, wherein the at least one transfer crane includes a mounting base configured to be secured to the walkway proximate to the at least one guide rail assembly.

6. The method of claim 1, wherein the at least one transfer crane includes a mounting base.

7. The method of claim 6, further comprising providing a transfer trolley with a base plate and a plurality of wheels and/or castors and securing the mounting base to the base plate of the transfer trolley.

8. The method of claim 7, wherein the walkway comprises at least one crane mounting plate, and wherein the base plate of the transfer trolley is configured to be secured to the at least one mounting plate.

9. The method of claim 7, wherein the plurality of wheels and/or castors are configured to engage in the parallel guide tracks.

10. The method of claim 1, wherein the at least one guide rail assembly comprises first and second parallel guide rails; a second air distribution conduit coupled to the first air distribution conduit; and a push-rod positioned between the guide rails and connected to the retrievable mounting frame assembly.

11. The method of claim 10, wherein the push-rod is configured to facilitate movement of the mounting frame assembly along the guide rails between the first position above the upper surface of the water and the second position.

* * * * *